US012675896B2

(12) United States Patent
Ono et al.

(10) Patent No.: US 12,675,896 B2
(45) Date of Patent: Jul. 7, 2026

(54) IMAGE PROCESSING APPARATUS, METHOD, AND PROGRAM

(71) Applicant: NTT, Inc., Tokyo (JP)

(72) Inventors: Masato Ono, Musashino (JP); Takashi Sano, Musashino (JP); Shinji Fukatsu, Musashino (JP); Yumi Kikuchi, Musashino (JP)

(73) Assignee: NTT, Inc., Tokyo (JP)

( * ) Notice: Subject to any disclaimer, the term of this patent is extended or adjusted under 35 U.S.C. 154(b) by 262 days.

(21) Appl. No.: 18/283,119

(22) PCT Filed: Mar. 23, 2021

(86) PCT No.: PCT/JP2021/012037
§ 371 (c)(1),
(2) Date: Sep. 20, 2023

(87) PCT Pub. No.: WO2022/201319
PCT Pub. Date: Sep. 29, 2022

(65) Prior Publication Data
US 2024/0161321 A1      May 16, 2024

(51) Int. Cl.
*G06T 7/55* (2017.01)
*G06T 7/62* (2017.01)
(52) U.S. Cl.
CPC . *G06T 7/55* (2017.01); *G06T 7/62* (2017.01)
(58) Field of Classification Search
CPC .... G06T 7/55; G06T 7/62; G06T 7/00; H04N 13/261
See application file for complete search history.

(56) References Cited

FOREIGN PATENT DOCUMENTS

WO      WO-2021004260 A1 *  1/2021  ............... G06T 7/55

OTHER PUBLICATIONS

Kellnhofer et al., "GazeStereo3D: Seamless Disparity Manipulations," Proceedings of the 43rd SIGGRAPH Conference on Computer Graphics and Interactive Technique, Anaheim, CA, Jul. 24-28, 2016, 35(4), 13 pages.
Lee et al., "Depth manipulation using disparity histogramanalysis for stereoscopic 3D," The Visual Computer, Sep. 2014, 30(4):455-465.

* cited by examiner

Primary Examiner — Chan S Park
Assistant Examiner — Daniel C Chang
(74) Attorney, Agent, or Firm — Fish & Richardson P.C.

(57) ABSTRACT

An image processing device according to an embodiment includes: a depth estimation unit that, when a size of a differential region between a first frame and a second frame at a timing later than a timing of the first frame in chronological order in a moving image satisfies a predetermined condition and is large, estimates a depth of at least a region corresponding to the differential region in the second frame; and a depth estimation result update unit that updates an estimation result of the depth of the first frame by using the region corresponding to the differential region to output the updated estimation result as a new estimation result of the depth of the second frame.

6 Claims, 5 Drawing Sheets

Figure 5:
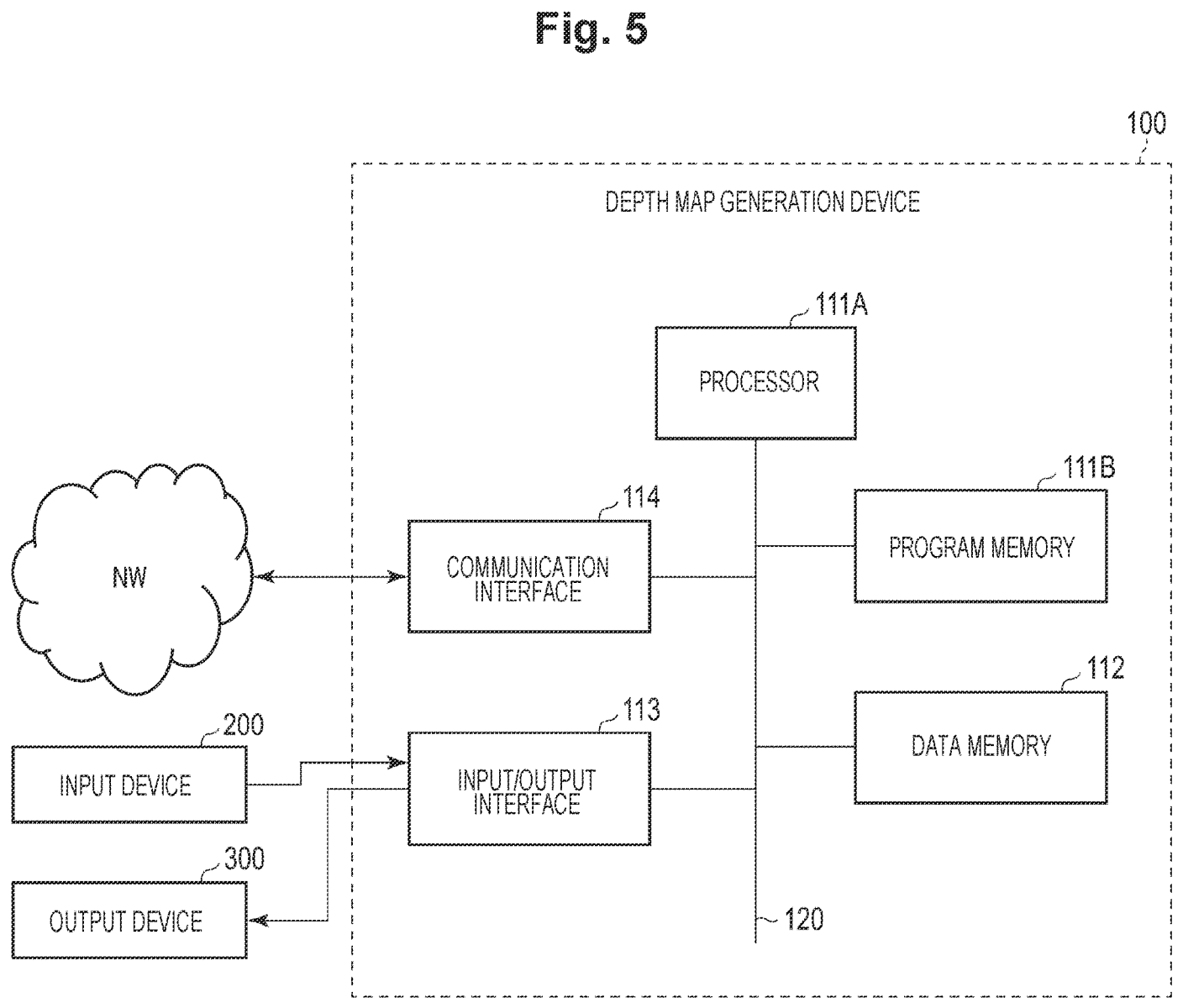

DEPTH MAP GENERATION DEVICE

111A PROCESSOR

111B PROGRAM MEMORY

112 DATA MEMORY

120

114 COMMUNICATION INTERFACE

113 INPUT/OUTPUT INTERFACE

NW

200 INPUT DEVICE

300 OUTPUT DEVICE

IMAGE PROCESSING APPARATUS, METHOD, AND PROGRAM

CROSS-REFERENCE TO RELATED APPLICATIONS

This application is a National Stage application under 35 U.S.C. § 371 of International Application No. PCT/JP2021/012037, having an International Filing Date of Mar. 23, 2021, the disclosure of which is considered part of the disclosure of this application, and is incorporated by reference in its entirety into this application.

TECHNICAL FIELD

An embodiment of the present invention relates to an image processing device, method, and program.

BACKGROUND ART

There is a technique of compressing a depth of a still image. For example, Non Patent Literature 1 discloses that a position where a target object exists is set on a display surface on the basis of the fact that a range in which a user effectively feels parallax is a periphery of the display surface and that a depth is non-linearly mapped onto as input image by setting a 5th percentile of the depth as a minimum value of the depth and setting a 95th percentile of the depth as a maximum value of the depth.

A function used when the depth is mapped as described above will be referred to as a depth compression function. In a case where depth compression processing is performed on each different image, the depth compression function is different depending on a distribution of the depth in the image.

Non Patent Literature 2 discloses that a parallax layer is derived from a histogram analysis result of parallax, and a depth within a certain range of a layer in which a target object exists is extended. Therefore, it is possible to sufficiently express a depth of a detailed part of the target object.

CITATION LIST

Non Patent Literature

Non Patent Literature 1: Gaze Stereo 3D: Seamless Disparity Manipulations (Petr Kelnhofer, et al., "GazeStereo3D: Seamless Disparity Manipulations", ACM Transactions on Graphics—Proceedings of ACM SIGGRAPH 2016, Volume 35, issue 4, 2016,
Non Patent Literature 2: Sangwoo Lee, Younghui Kim, Jungjin Lee, Kyehyun Kim, Kyunghan Lee and Junyong Sob, "Depth manipulation using disparity histogram analysis for stereoscopic 3D", The Visual Computer 30(4):455-465, April 2014.

SUMMARY OF INVENTION

Technical Problem

In a case where the above technique of compressing the depth is applied to a moving image (video) as it is, a display surface needs to be set in each frame of the moving image. Therefore, it is necessary to perform the depth compression processing on all frames of the moving image.

In each frame of the video, the frames have short intervals, for example, the frames have intervals of 16.6 msec in a case where a frame rate is 60 fps, and thus a motion of a subject is generally limited. Therefore, a large difference is not generated between the frames.

However, in a case where a depth estimation result has low accuracy, that is, in a case where depth information varies in each frame, the user may feel uncomfortable, for example, may feel that the depth seems to change even though the subject only slightly moves while the user is viewing a three-dimensional (3D) video.

The depth compression processing is processing of extending a depth of an uncompressed image and therefore also extends the variation of the depth information. Thus, the user may feel more uncomfortable.

In a case where the conventional depth compression processing is performed, the processing includes processing of solving an optimization problem. Therefore, as the processing time increases, the depth compression function further varies and may result in an abnormal solution.

The present invention has been made in view of the above circumstances, and an object thereof is to provide an image processing device, method, and program capable of appropriately compressing a depth of an image.

Solution to Problem

An image processing device according to an aspect of the present invention includes: a difference calculation unit configured to calculate a size of a differential region between a first frame and a second frame at a timing later than a timing of the first frame in chronological order in a moving image; a depth estimation unit configured to estimate a depth of the first frame and, when the size of the differential region calculated by the difference calculation unit satisfies a predetermined condition and is large, estimate a depth of at least a region corresponding to the differential region in the second frame; and a depth estimation result update unit configured to update an estimation result of the depth of the first frame obtained by the depth estimation unit by using the region corresponding to the differential region between the second frame and the first frame calculated by the difference calculation unit in an estimation result of the depth of the second frame to output the updated estimation result as a new estimation result of the depth of the second frame.

An image processing method according to an aspect of the present invention is an image processing method performed by an image processing device, the image processing method including: calculating a size of a differential region between a first frame and a second frame at a timing later than a timing of the first frame in chronological order in a moving image; estimating a depth of the first frame and, when the calculated size of the differential region satisfies a predetermined condition and is large, estimating a depth of at least a region corresponding to the differential region in the second frame; and updating an estimation result of the depth of the first frame using the region corresponding to the calculated differential region between the second frame and the first frame in an estimation result of the depth of the second frame to output a new estimation result of the depth of the second frame.

Advantageous Effects of Invention

According to the present invention, it is possible to appropriately compress a depth of an image.

BRIEF DESCRIPTION OF DRAWINGS

FIG. 1 is a block diagram illustrating an application example of a depth map generation device according to an embodiment of the present invention.

FIG. 5 is a block diagram illustrating an example of a hardware configuration of a depth map generation device according to an embodiment of the present invention.

DESCRIPTION OF EMBODIMENTS

Figure 2:
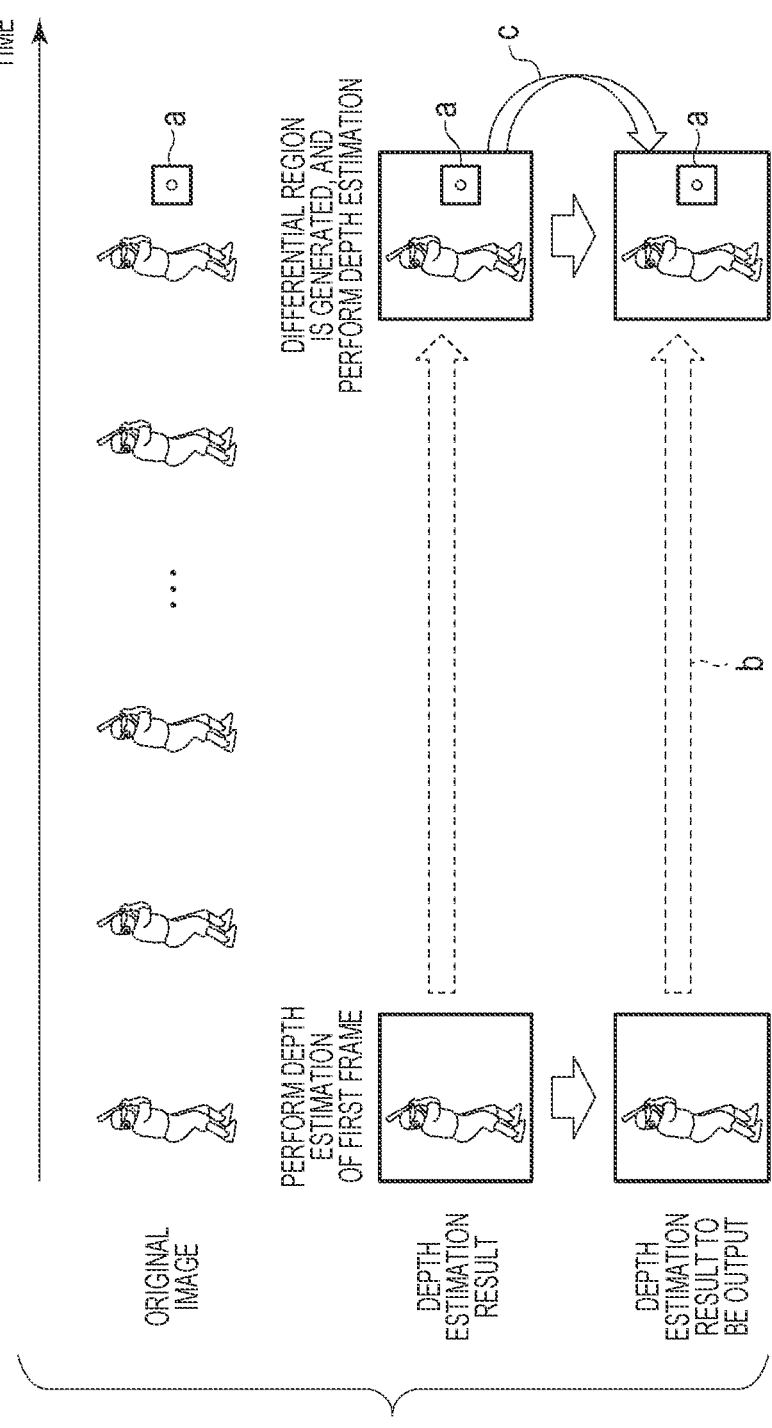
FIG. 2 illustrates an example of a relationship between chronologically continuous frames and depth estimation results.

Hereinafter, an embodiment according to the present invention will be described with reference to the drawings.

Figure 1:
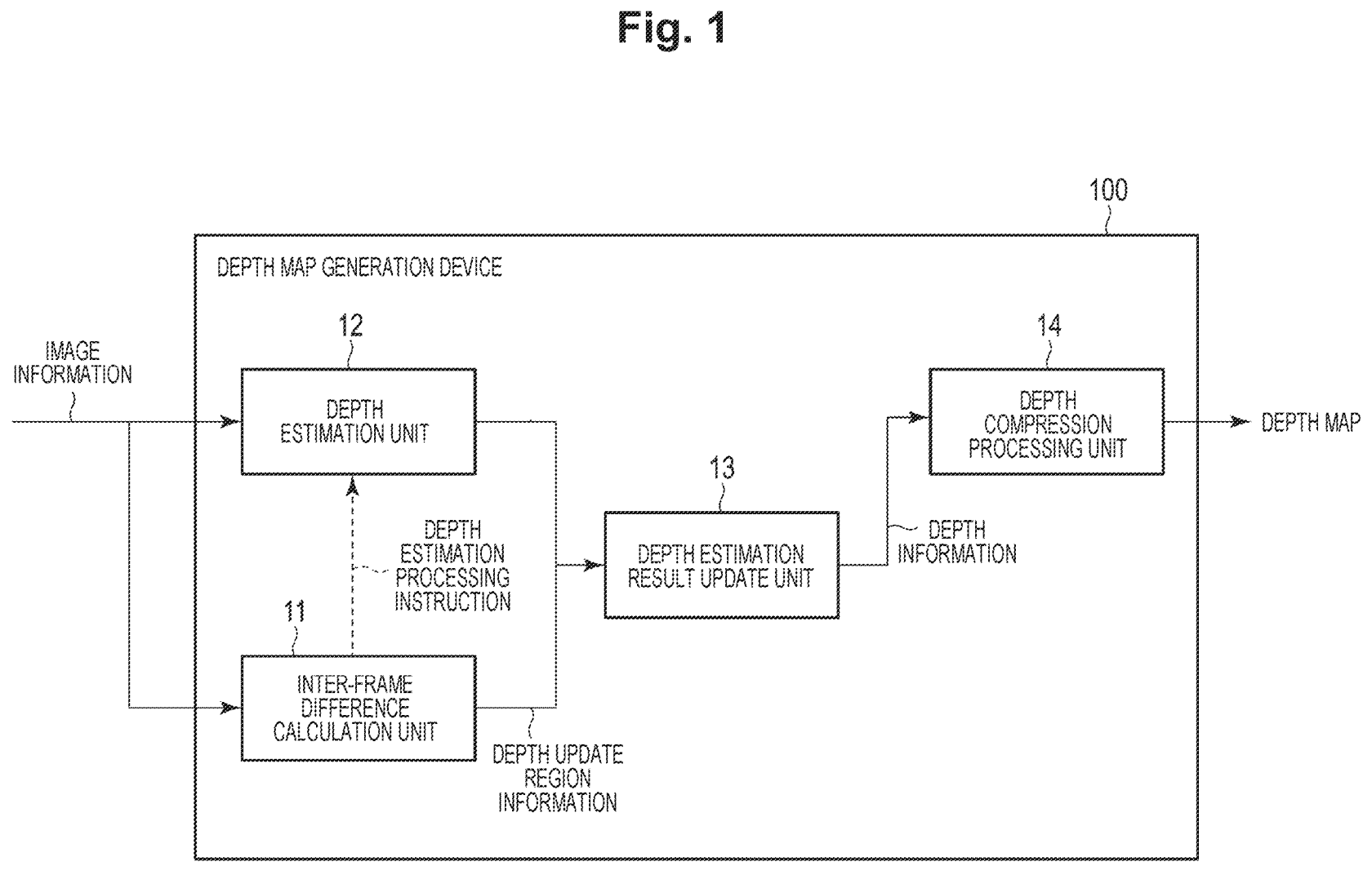

FIG. 1 is a block diagram illustrating an application example of a depth map generation device according to an embodiment of the present invention.

As illustrated in FIG. 1, a depth map generation device 100 serving as an image processing device according to an embodiment of the present invention includes an inter-frame difference calculation unit 11, a depth estimation unit 12, a depth estimation result update unit 13, and a depth compression processing unit 14.

In the present embodiment, in a case where a difference between chronologically continuous frames in an input image (moving image) is relatively small, the depth map generation device 100 uses a depth estimation result (also referred to as depth information) regarding the past frame as it is as depth estimation results of the continuous frames. This makes possible to reduce an influence caused by variation or an error of the dep estimation result. Further, a processing load regarding output of the depth estimation result can be efficient.

In the present embodiment, the depth map generation device 100 calculates a size of a difference generation region between frames on the basis of a difference between frames in chronological order in an original image, that is, a difference between a frame at an earlier timing (also referred to as an earlier frame) and a frame at a later timing (also referred to as a later frame). When the calculated size of the generation region exceeds, for example, a threshold that is a value satisfying a predetermined condition, the depth map generation device 100 sets the generation region as depth update region information that is a region for updating the depth estimation result of the earlier frame.

The depth map generation device 100 may set, as the depth update region information, a region surrounded by a rectangle in which the difference between the frames has been actually generated or a region combined with a region in which an object has been detected by segmentation processing.

The depth map generation device 100 performs depth estimation processing on a frame in which the depth update region is set, that is, at least a region corresponding to the depth update region in the later frame. By using the region corresponding to the depth update region in the estimation result, the depth map generation device 100 generates and outputs information obtained by updating the depth estimation result regarding the earlier frame as a new depth estimation result regarding the later frame.

When updating the depth estimation result, the depth map generation device 100 may perform blending processing or correct a depth value of the update region in order to blur boundaries between regions. The correction of the depth value of the update region is, for example, processing of adding or subtracting the depth value of the entire update region such that depth values near the boundaries become similar.

FIG. 2 illustrates an example of a relationship between chronologically continuous frames and depth estimation results.

In the example of FIG. 2, among frames regarding a motion of a sports player, a first frame that is the earlier frame is subjected to the depth estimation processing, and a depth estimation result is output.

In this example, when a difference between the earlier frame that is the first frame and a later frame after the earlier frame, here, after several frames, or a frame traced back in chronological order by one or a plurality of frames between the later frame and the earlier frame, or an accumulated value of differences between chronologically adjacent frames among those frames exceeds a predetermined value, the depth map generation device 100 performs the depth estimation processing of the later frame and outputs an estimation result. FIG. 2 illustrates the difference generation region surrounded by the rectangle (see a in FIG. 2).

The depth map generation device 100 does not perform the depth estimation processing regarding each frame between the earlier frame and the later frame to be subjected to the depth estimation processing, that is, does not set each frame from a frame immediately after the earlier frame to a frame immediately before the later frame as a frame to be subjected to the depth estimation processing, uses the depth estimation result regarding the earlier frame as a depth estimation result regarding each frame between the earlier frame and the later frame, and outputs the depth estimation result regarding the earlier frame as it is as shown by h in FIG. 2.

The depth map generation device 100 updates part of the depth estimation result regarding the earlier frame as shown by c in FIG. 2 by using the depth update region information that is a region in which the differential region is surrounded by the rectangle in the depth estimation result regarding the later frame as shown by a in FIG. 2 and outputs the update result to the depth compression processing unit 14 as the depth information that is a new depth estimation result of the later frame.

The depth map generation device 100 performs the depth compression processing of mapping depth information onto each frame including the earlier frame and the later frame on the basis of the updated depth information or depth information regarding each frame between the earlier frame and the later frame.

Figure 3:
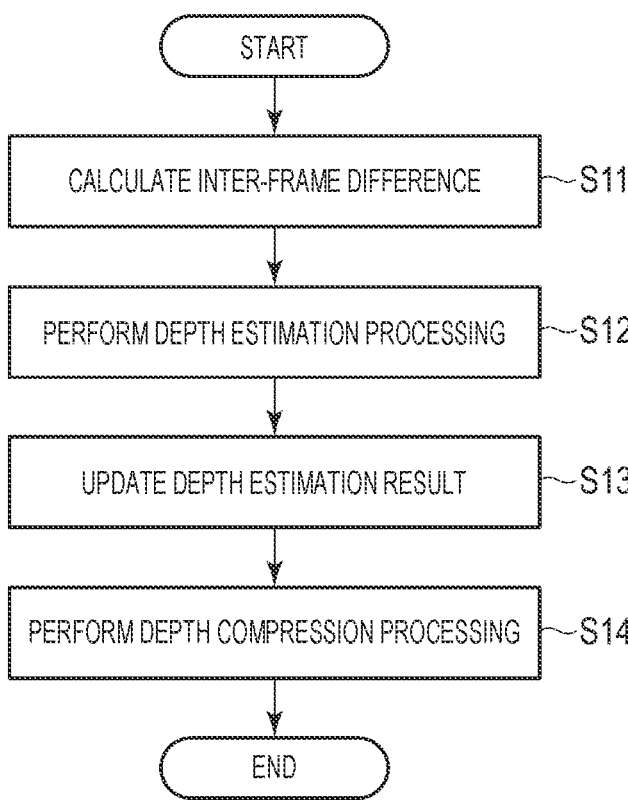
FIG. 3 is a flowchart showing an example of a processing operation by a depth map generation device according to an embodiment of the present invention.

FIG. 3 is a flowchart showing an example of a processing operation by the image processing device according to the embodiment of the present invention.

The inter-frame difference calculation unit 11 calculates a difference between chronologically continuous frames, that is, a difference between the earlier frame and the later frame, and a differential region that is a region when the difference exceeds the threshold (S11).

When the difference exceeds the threshold, the inter-frame difference calculation unit 11 instructs the depth estimation unit 12 to perform depth estimation processing regarding the later frame and outputs information regarding the differential region to the depth estimation result update unit 13 as depth update region information regarding the later frame.

The depth estimation unit 12 estimates depth information of the later frame and outputs the depth information that is a depth estimation result to the depth estimation result update unit 13 (S12). Further, the depth estimation unit 12 does not perform the depth estimation processing regarding each frame between the earlier frame and the later frame, uses the depth estimation result regarding the earlier frame as the depth estimation result regarding each frame between the earlier frame and the later frame, and outputs the depth estimation result regarding the earlier frame as it is to the depth estimation result update unit 13.

The depth estimation result update unit 13 receives input of the latest depth estimation result of the earlier frame from the depth estimation unit 12 and always holds the latest depth estimation result in an internal memory or another external storage device, for example. Note that the latest depth estimation result of the earlier frame may be held in an internal memory of the depth estimation unit 12 and be read by the depth estimation result update unit 13 in accordance with processing. Every time target frames to calculate a difference are changed, the held depth estimation result is sequentially updated to a depth estimation result regarding an earlier frame of those frames.

Then, by using (1) the depth update region information regarding the later frame received from the inter-frame difference calculation unit 11, (2) the depth estimation result regarding the later frame output from the depth estimation unit 12, and (3) the held depth estimation result regarding the earlier frame, the depth estimation result update unit 13 updates the depth estimation result regarding the earlier frame by using the depth update region information regarding the later frame in the depth estimation result regarding the later frame, generates the depth estimation result as a new depth estimation result regarding the later frame, and outputs the depth estimation result to the depth compression processing unit 14 (S13). Note that, in a case where a part to be updated of the depth estimation result regarding the earlier frame can be specified on the basis of, for example, coordinate information of each frame, a new depth estimation result regarding the later frame obtained by updating the depth estimation result regarding the earlier frame may be generated only on the basis of the depth update region information regarding the later frame and the held depth estimation result regarding the earlier frame.

Based on the depth information of each frame including the new depth estimation result regarding the later frame received from the depth estimation result update unit 13, the depth compression processing unit 14 performs depth compression processing of mapping the depth information corresponding to each frame onto the frame (S14).

Figure 4:
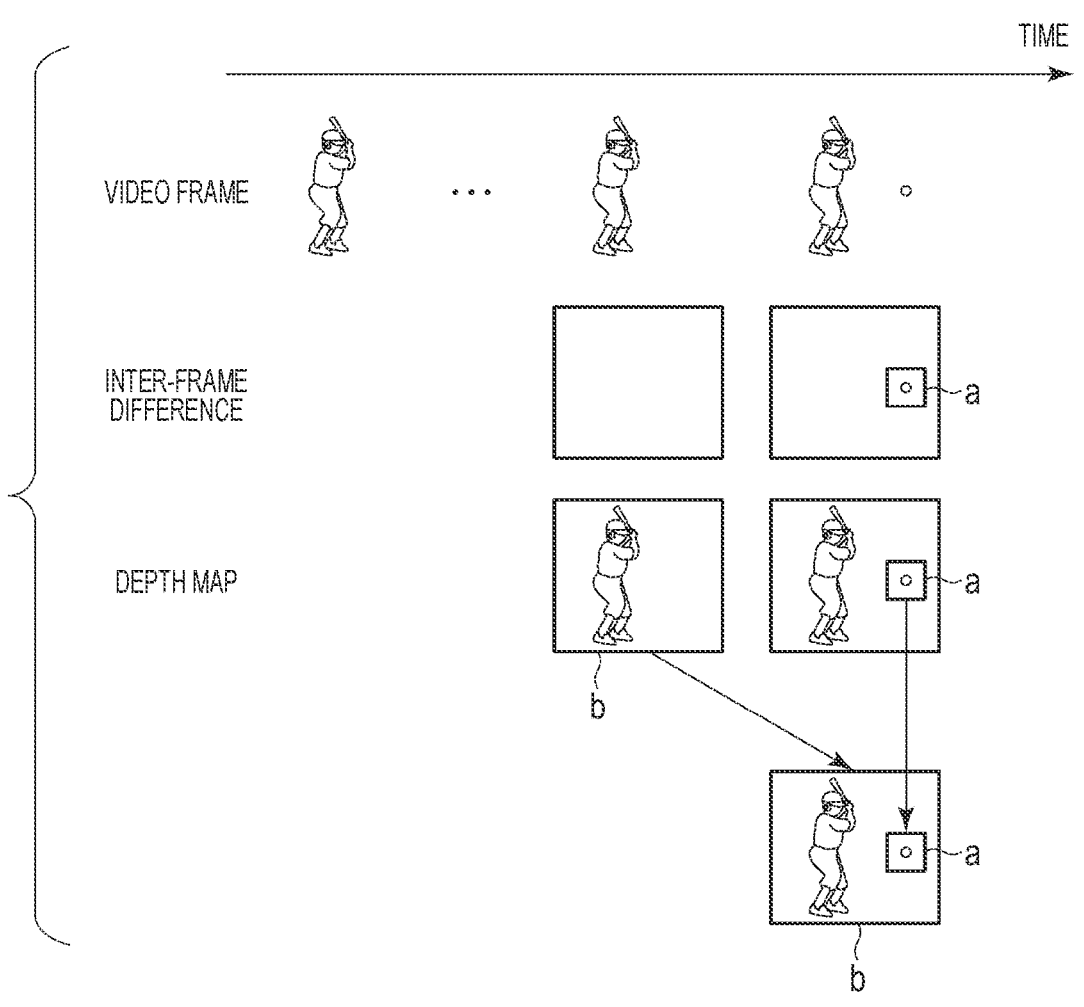
FIG. 4 illustrates a specific example of a processing operation by a depth map generation device according to an embodiment of the present invention.

FIG. 4 illustrates a specific example of a processing operation by the depth map generation device according to the embodiment of the present invention.

In the present embodiment, as described above, the depth only regarding the differential region is estimated for the later frame (see a in FIG. 4), the depth estimation result of the earlier frame (see b in FIG. 4) is updated based on the estimation result, and thus the depth estimation result may be output as a new depth estimation result regarding the later frame. However, the present embodiment is not limited thereto, and, for example, in a case where an inter-frame difference is generated, depth estimation is performed on the entire later frame, then only the differential region of the estimation result is reflected in the depth estimation result of the earlier frame and is updated, and thus the updated depth estimation result may be output as the depth estimation result of the later frame.

In the example of FIG. 4, the following processing (1) to (3) can be performed by each unit of the depth map generation device 100.

(1) The inter-frame difference calculation unit 11 calculates a difference between the earlier frame and the later frame and calculates a region having the difference. The region in the frame will also be referred to as a "differential region".

Next, an example of calculation of a differential region will be described.

For example, when a ratio of a region having a difference between frames to the entire region of the frame is equal to or more than a threshold designated in advance, the inter-frame difference calculation unit 11 can calculate a rectangular region including the region having the difference as a differential region.

A size of the rectangular region is equal to or more than a size designated in advance, for example, a size equal to or more than "N pixels×N pixels".

Further, when a ratio of a region having a difference to each segmented ect region is equal to or more than a threshold designated in advance in combination with separately performed segmentation processing, the inter-frame difference calculation unit 11 can also calculate the region having the corresponding difference as a differential region.

(2) The depth estimation result update unit 13 extracts a depth map of the differential region from a depth estimation result that is a depth map of the later frame.

(3) The depth estimation result update unit 13 updates a region corresponding to the differential region in a depth estimation result that is a depth map of the earlier frame to the depth map of the differential region regarding the later frame, thereby generating a new depth map regarding the later frame.

At this time, the depth estimation result update unit 13 may simply update only the region corresponding to the differential region or may perform processing indicated by (3-1) or (3-2) below.

(3-1) Correction of Depth Map of Differential Region

The depth estimation result update unit 13 can set a region having a designated width around a differential region, compare modes of depth values in the set region, and uniformly add or subtract values of a depth map of the differential region such that the values become the same.

(3-2) Blending Around Differential Region

The depth estimation result update unit 13 can perform blending by using a designated width on a periphery of a differential region.

FIG. 5 is a block diagram illustrating an example of a hardware configuration of the depth map generation device according to the embodiment of the present invention.

In the example of FIG. 5, the depth map generation device 100 according to the above embodiment is configured as, for example, a server computer or a personal computer and includes a hardware processor 111A such as a central processing unit (CPU). The hardware processor 111A is connected to a program memory 111B, a data memory 112, an input/output interface 113, and a communication interface 114 via a bus 120.

The communication interface 114 includes, for example, one or more wireless communication interface units and enables transmission/reception of information to/from a communication network NW. The wireless interface is, for example, an interface employing a low-power wireless data communication standard such as a wireless local area network (LAN).

The input/output interface 113 is connected to an input device 200 and an output device 300 attached to the depth map generation device 100 and used by a user, for example.

The input/output interface 113 performs processing of fetching operation data input by, for example, the user through the input device 200 such as a keyboard, a touch panel, a touchpad, or a mouse, outputting output data to the output device 300 including a display device made from, for example, liquid crystal or organic electro-luminescence (EL), and displaying the output data on the output device. Note that the input device 200 and the output device 300 may be devices included in the depth map generation device 100 or may be an input device and output device of another information terminal that can communicate with the depth map generation device 100 via the network NW.

The program memory 111B is used as a non-transitory tangible storage medium, for example, as a combination of a non-volatile memory enabling writing and reading at any time, such as a hard disk drive (HDD) or a solid state drive (SSD), and a non-volatile memory such as a read only memory (ROM) and stores programs necessary for executing various kinds of control processing according to the embodiment.

The data memory 112 is used as a tangible storage medium, for example, as a combination of the above non-volatile memory and a volatile memory such as a random access memory (RAM) and is used to store various kinds of data acquired and created during various kinds of processing.

The depth map generation device 100 according to the embodiment of the present invention can be configured as a data processing device including the inter-frame difference calculation unit 11, the depth estimation unit 12, the depth estimation result update unit 13, and the depth compression processing unit 14 illustrated in FIG. 1 as a processing function unit by software.

Each information storage unit used as a work memory or the like by each unit of the depth map generation device 100 can be configured by using the data memory 112 in FIG. 5. However, those configured storage areas are not essential configurations in the depth map generation device 100 and may be areas provided in, for example, an external storage medium such as a universal serial bus (USB) memory or a storage device such as a database server provided in a cloud.

All the processing function units in the inter-frame difference calculation unit 11, the depth estimation unit 12, the depth estimation result update unit 13, and the depth compression processing unit 14 can be achieved by causing the hardware processor 111A to read and execute the programs stored in the program memory 111B. Note that some or all of these processing function units may be implemented in other various forms including an integrated circuit such as an application specific integrated circuit (ASIC) or a field-programmable gate array (FPGA).

As described above, in a case where a size of a differential region between an earlier frame and a later frame in chronological order in a moving image satisfies a predetermined condition and is large, the depth map generation device according to the embodiment of the present invention estimates a depth of at least a region corresponding to the differential region in the later frame, updates an estimation result of a depth of the earlier frame by using the region corresponding to the differential region in the estimation result of the depth of the later frame, and thus outputs a new estimation result of the depth of the later frame.

In the embodiment of the present invention, for depth compression processing of a depth map necessary for effective 3D representation, focusing on the fact that there is a relation between a chronological inter-frame difference and a depth map of an original video, a depth map regarding the earlier frame is updated to a new depth map regarding the later frame only on the basis of a corresponding differential region in a case where the difference is generated between the frames. This makes it possible to prevent an influence of generation accuracy of the depth map on depth compression processing, which has been generated in the related arts.

The embodiment of the present invention can also be used to improve quality of the depth map itself, that is, to prevent variation in a previous stage of the depth compression processing and therefore can also be used, for example, in the field of automatic driving in which the depth map is used.

The method described in each embodiment can be stored in a recording medium such as a magnetic disk (e.g. Floppy (registered trademark) disk or hard disk), an optical disc (e.g. CD-ROM, DVD, or MO), or a semiconductor memory (e.g. ROM, RAM, or flash memory) as a program (software means) that can be executed by a computer and can be distributed by being transmitted through a communication medium. Note that the programs stored in the medium also include a setting program for configuring, in the computer, software means (including not only an execution program but also tables and data structures) to be executed by the computer. The computer that implements the present device executes the above processing by reading the programs recorded in the recording medium, constructing the software means by the setting program as needed, and controlling an operation by the software means. Note that the recording medium described in the present specification is not limited to a recording medium for distribution, but includes a storage medium such as a magnetic disk or a semiconductor memory provided in the computer or in a device connected via a network.

The present invention is not limited to the above embodiment, and various modifications can be made in the implementation stage within the scope of the invention. Each embodiment may be implemented in appropriate combination, and in that case, combined effects can be obtained. Further, the above embodiment includes various inventions, and the various inventions can be extracted based on a combination selected from a plurality of disclosed components. For example, even if some components are deleted from all the components described in the embodiment, in a case where the problem can be solved and the effects can be obtained, a configuration from which the components have been deleted can be extracted as an invention.

REFERENCE SIGNS LIST

100 Depth map generation device
11 Inter-frame difference calculation unit
12 Depth estimation unit
13 Depth estimation result update unit
14 Depth compression processing unit

The invention claimed is:

1. An image processing device comprising one or more processors configured to execute instructions that cause the image processing device to perform operations comprising:

calculating a size of a differential region between a first frame and a second frame at a timing later than a timing of the first frame in chronological order in a moving image;

estimating a depth of the first frame and, when the size of the differential region exceeds a predetermined value, estimating a depth of at least a region corresponding to the differential region in the second frame; and updating an estimation result of the depth of the first frame by using the estimated depth of the region corresponding to the differential region to output the updated estimation result as a new depth estimation result for the second frame.

2. The image processing device according to claim 1, wherein the estimation result of the depth of the first frame is output as an estimation result of a depth of at least one frame between the timing of the first frame and the timing of the second frame.

3. The image processing device according to claim 1, wherein the one or more processors are configured to:

estimate a depth of an entire second frame when the size of the differential region exceeds a predetermined value, and using the region corresponding to the differential region in the estimation result of the depth of the entire second frame to output the updated estimation result as the new depth estimation result for the second frame.

4. An image processing method performed by an image processing device, the image processing method comprising:

calculating a size of a differential region between a first frame and a second frame at a timing later than a timing of the first frame in chronological order in a moving image;

estimating a depth of the first frame and, when the calculated size of the differential region exceeds a predetermined value, estimating a depth of at least a region corresponding to the differential region in the second frame; and updating an estimation result of the depth of the first frame by using the estimated depth of the region corresponding to the calculated differential region to output the updated estimation result as a new depth estimation result for the second frame.

5. The image processing method according to claim 4, further comprising outputting the estimation result of the depth of the first frame as an estimation result of a depth of at least one frame between the timing of the first frame and the timing of the second frame.

6. A non-transitory computer-readable medium storing program instructions that, when executed, cause one or more processors to perform operations comprising:

calculating a size of a differential region between a first frame and a second frame at a timing later than a timing of the first frame in chronological order in a moving image;

estimating a depth of the first frame and, when the calculated size of the differential region exceeds a predetermined value, estimating a depth of at least a region corresponding to the differential region in the second frame; and updating an estimation result of the depth of the first frame by using the estimated depth of the region corresponding to the calculated differential region to output the updated estimation result as a new depth estimation result for the second frame.

* * * * *